United States Patent
Bunker

(10) Patent No.: US 7,022,429 B2
(45) Date of Patent: Apr. 4, 2006

(54) FLUID PASSAGES FOR POWER GENERATION EQUIPMENT

(75) Inventor: Ronald Scott Bunker, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 604 days.

(21) Appl. No.: 10/063,467

(22) Filed: Apr. 25, 2002

(65) Prior Publication Data

US 2003/0203259 A1    Oct. 30, 2003

(51) Int. Cl.
*H01M 8/00* (2006.01)

(52) U.S. Cl. .......................... 429/34; 429/30

(58) Field of Classification Search ............ 429/30, 429/31, 33, 34–39, 12, 13

See application file for complete search history.

(56) References Cited

U.S. PATENT DOCUMENTS

| 5,518,829 A | * | 5/1996 | Satake et al. ............... 429/30 |
| 5,820,655 A | | 10/1998 | Gottzmann et al. |
| 2004/0013922 A1 | * | 1/2004 | Tsuji ......................... 429/24 |

FOREIGN PATENT DOCUMENTS

| EP | 1113518 | 7/2001 |
| JP | 63190255 | 8/1988 |
| JP | 2129858 | 5/1990 |
| WO | WO 01/41239 | 6/2001 |

* cited by examiner

Primary Examiner—Michael Barr
Assistant Examiner—Monique Wills
(74) Attorney, Agent, or Firm—Patrick K. Patnode; Christian G. Cabou

(57) ABSTRACT

A solid oxide fuel cell is provided wherein the solid oxide fuel cell comprises a thermal management section and an electrolytic section disposed adjacent the thermal management section wherein a plurality of concavities are disposed on at least one of the thermal management and electrolytic sections so as to cause hydrodynamic interactions and affect the heat transfer rate between a fluid and the concavities when the fluid is disposed over the concavities.

32 Claims, 6 Drawing Sheets

FLUID PASSAGES FOR POWER GENERATION EQUIPMENT

BACKGROUND OF INVENTION

The present invention relates generally to power generation equipment, and more particularly to improved fluid passages for solid oxide fuel cells.

A high temperature, solid oxide fuel cell (hereinafter "SOFC") stack is typically constructed of an array of axially-elongated tubular-shaped connected SOFCs and associated fuel and air distribution equipment. In addition, typical alternative constructions to the tubular SOFC are planar cross flow fuel cells, counterflow fuel cells and parallel flow fuel cells which are constructed from flat single cell members. Such members typically comprise trilayer anode/electrolyte/cathode components which conduct current from cell to cell and provide channels for gas flow into a cubic structure or stack.

SOFCs generate electrical energy through electrochemical reactions between an oxidant and hydrocarbon fuel gas to produce a flow of electrons in an external circuit. In addition, SOFCs generate waste heat that is typically removed via an oxidant in order to maintain a desired temperature level of SOFC components such as the anode, cathode and electrolyte.

While SOFCs have demonstrated the potential for high efficiency and low pollution in power generation, some problems remain associated with temperature regulation of the components in SOFCs. SOFCs typically comprise cooling channels (in alternating flat single cell sections) or riser tubes (in tubular SOFCs) in which the oxidant, typically air, is used to aid in the transfer or removal of the waste heat so as to maintain the stack temperature at or below prescribed limits and maintain a predetermined thermal gradient in the SOFC. Such channels or riser tubes; however, typically comprise smooth surfaces having the undesired characteristic of providing low thermal transfer coefficients between the channel or tube surface and the oxidant.

Accordingly, there is a need in the art for a SOFC having improved fluid passages that provide improved heat transfer characteristics.

SUMMARY OF THE INVENTION

One embodiment of the present invention comprises a solid oxide fuel cell comprising a thermal management section and an electrolytic section disposed adjacent the thermal management section wherein a plurality of concavities are disposed on at least one of the thermal management and electrolytic sections so as to cause hydrodynamic interactions and affect the heat transfer rate between a fluid and the concavities when the fluid is disposed over the concavities.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
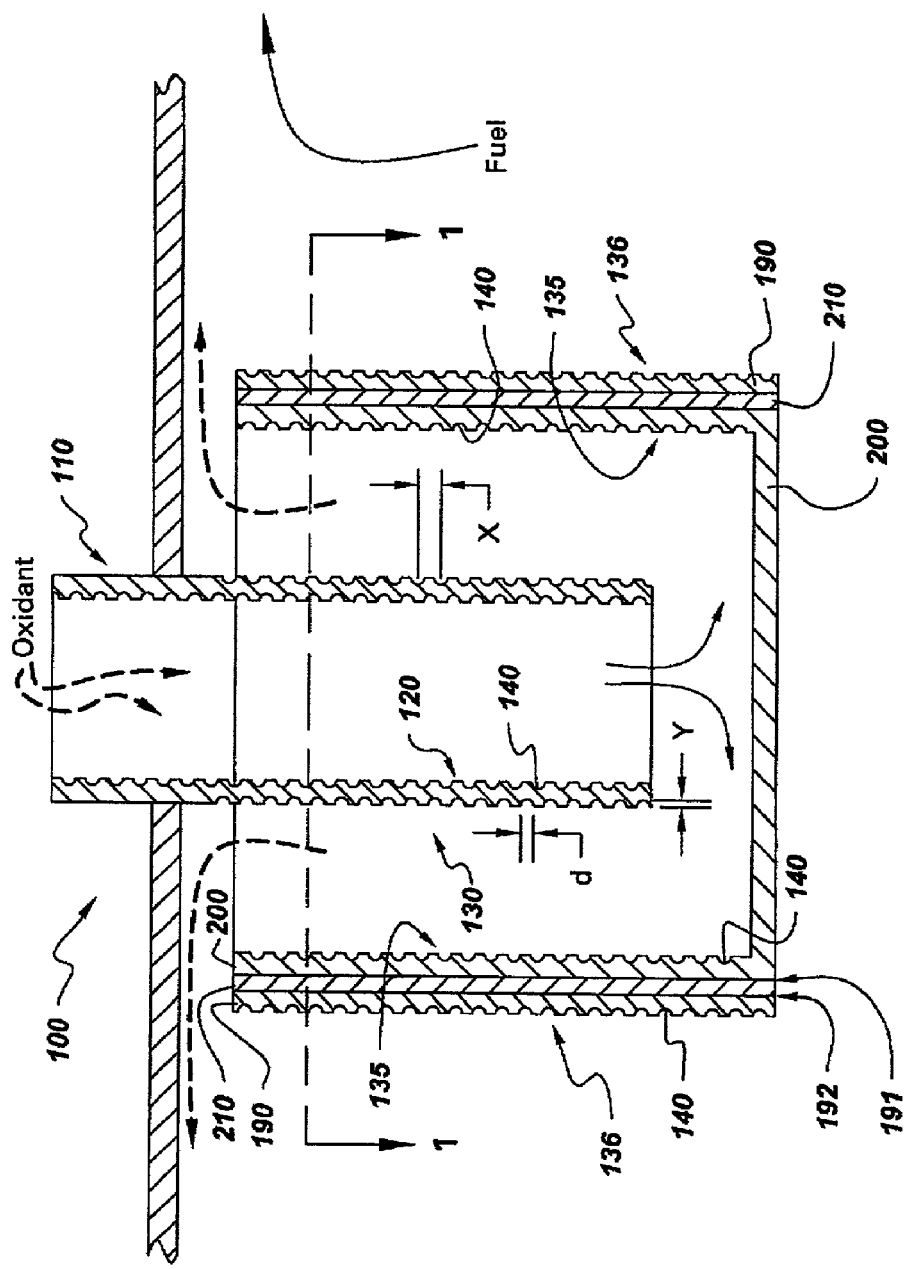
FIG. 1 is a cross sectional view of a tubular solid oxide fuel cell in accordance with one embodiment of the present invention.

Typical solid oxide fuel cells are disposed in a power generation apparatus and comprise tubular solid oxide fuel cells (hereinafter SOFCs) (see FIGS. 1–2) or planar cross flow solid oxide fuel cell stacks (see FIGS. 3–6). In addition, SOFCs typically comprise a thermal management section 101 and an electrolytic section 102 (see FIG. 1). As discussed below, the thermal management section 101 typically comprises a riser tube 110 disposed within the electrolytic section 102 for tubular SOFCs. In addition, the thermal management section 101 typically comprises an (meaning at least one) oxidant section 150 and a (meaning at least one) fuel section 160 wherein the electrolytic section 102 is typically disposed between both sections for planar cross flow SOFCs (see FIGS. 3–6). The electrolytic section 102 typically comprises an anode 190, cathode 200 and an electrolyte 210. As used herein, the terms "thereon", "therein", "over", "above", "under" and the like are used to refer to relative location of elements of the SOFC 100 as illustrated in the Figures and are not meant to be a limitation in any manner with respect to the orientation or operation of the SOFC 100. For purposes of simplicity, both tubular solid oxide fuel cells (see FIGS. 1–2) and planar cross flow solid oxide fuel cells (see FIGS. 3–6) will hereinafter be generically described as SOFCs 100.

In operation, a gaseous fuel (as indicated by the solid arrow termed "FUEL" in drawing FIGS. 1–2), such as natural gas or hydrogen, is directed axially over an external wall surface 135 of the SOFC 100. In addition, an oxidant (as indicated by the dashed arrows termed "OXIDANT" in drawing FIGS. 1–2), such as air or oxygen, is fed through the riser tube 110 (see FIG. 1). The riser tube 110 comprises a riser tube internal surface 120 and a riser tube external surface 130 and is positioned within the annulus of the SOFC 100. Such oxidant is initially introduced into the riser tube internal surface 120 wherein the oxidant subsequently flows back up the SOFC 100 between the riser tube external surface 130 and an internal wall surface 135.

Figure 3:
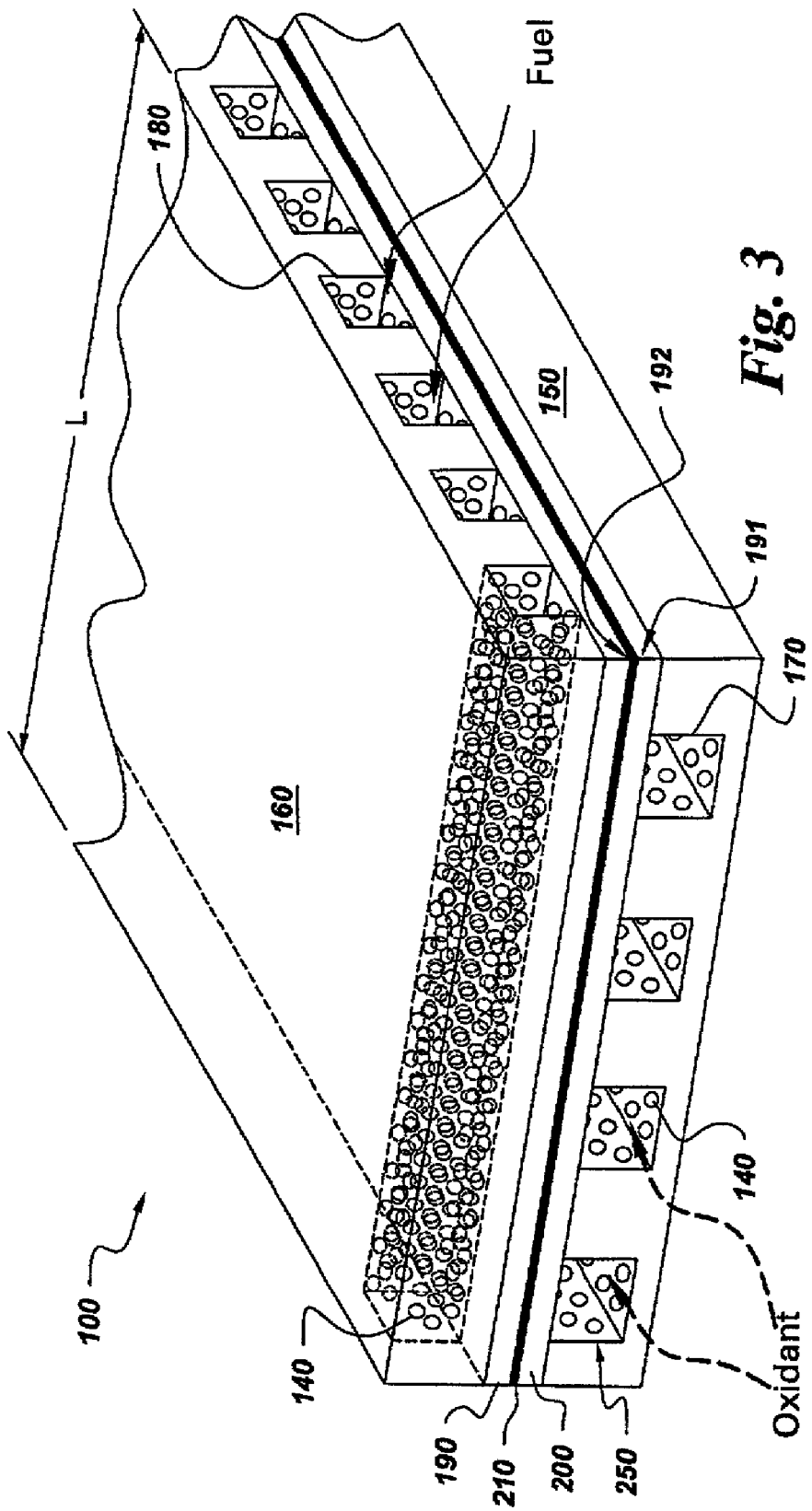
FIG. 3 is a perspective view of a planar cross flow solid oxide fuel cell in accordance with another embodiment of the present invention.
Figure 4:
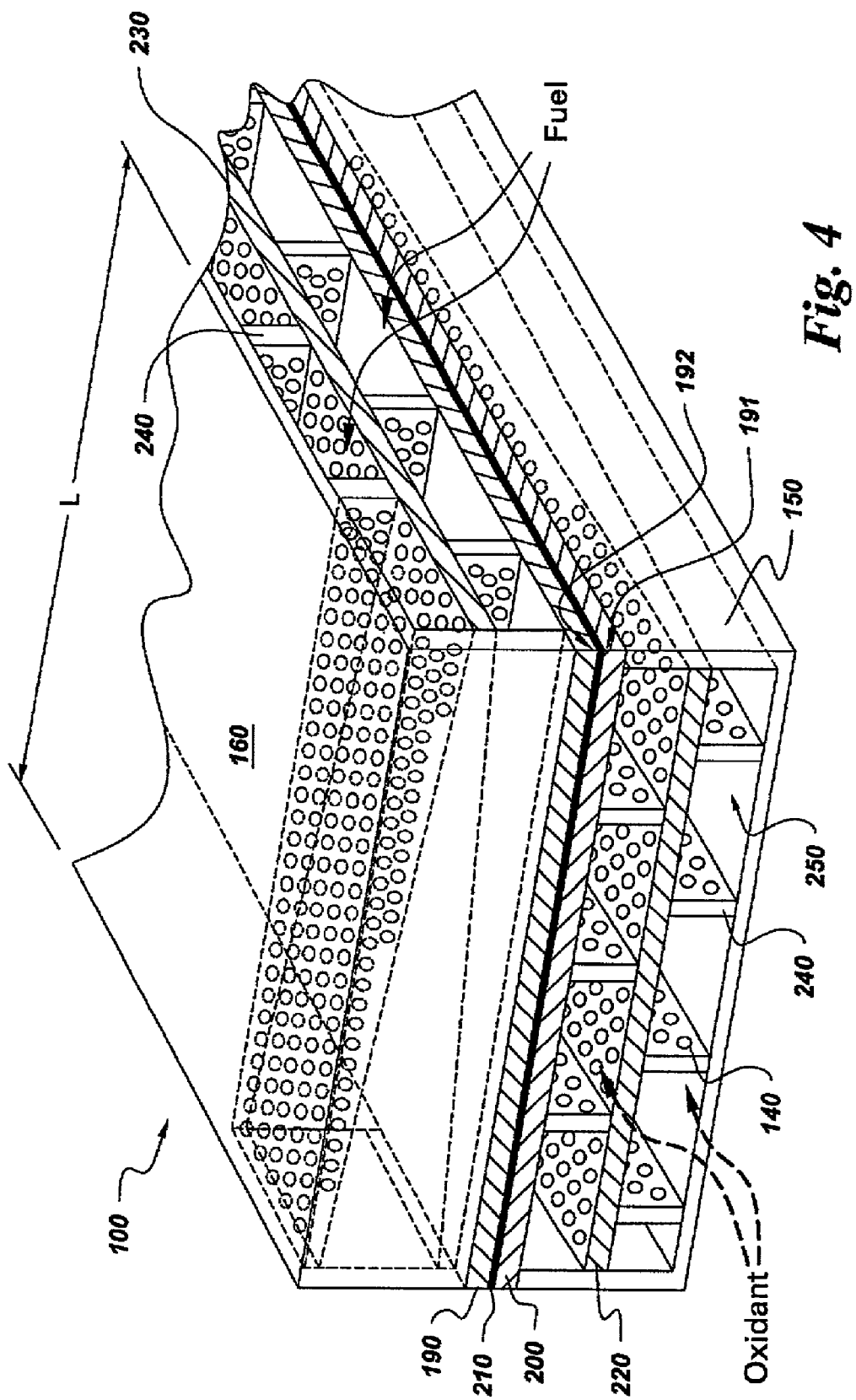
FIG. 4 is a perspective view of the planar cross flow solid oxide fuel cell of FIG. 3 in accordance with another embodiment of the present invention.

The planar cross flow SOFC 100 comprises the oxidant section 150 having an (meaning at least one) oxidant channel 170 disposed therein and the fuel section 160 having a (meaning at least one) fuel channel 180 disposed therein (see FIG. 3). This embodiment of the SOFC 100 is typically constructed from flat single cell sections that typically comprise the oxidant section 150 and the fuel section 160 wherein the channels of such sections allow the flow of an oxidant (as indicated by the dashed arrows termed "OXIDANT" in drawing FIGS. 3–6) and a gaseous fuel (as indicated by the solid arrow termed "FUEL" in drawing FIGS. 3–6) into a cubic structure or stack. It will be appreciated that the position and orientation of the oxidant section 150 and the fuel section 160 can vary and the position and orientation of such sections in FIGS. 3–6 are used by way of illustration and not limitation.

In operation, the fuel is directed over the external wall surface 135 of the tubular SOFC 100 (see FIGS. 1–2) or through the fuel channel 180 of the planar cross flow SOFC 100 (see FIGS. 3–6). The oxidant, typically preheated air or oxygen, is directed through the riser tube 110 in the tubular SOFC 100 (see FIGS. 1–2) or directed through the oxidant channel 170 of the planar cross flow SOFC 100 (see FIGS. 3–6). In both types of SOFCs 100, the oxidant (oxygen molecules) passes through the cathode 200 and forms oxygen ions at a cathode electrolyte interface 191. Subsequently, the oxygen ions migrate through the electrolyte 210 to combine with the fuel at an anode electrolyte interface 192 thereby releasing electrons at the anode 190. The electrons are then collected at the cathode 200 through an external load circuit (not shown) thereby generating a flow of electrical current in the external load circuit from the anode 190 to the cathode 200. As a result of the interactions at the anode electrolyte interface 192, the SOFC 100 generates heat that must be removed in order to maintain a desired temperature level and a predetermined thermal gradient in the SOFC 100. Such removal of heat is typically accomplished through the of the oxidant into the riser tube 110 (see FIGS. 1–2) or in the oxidant channel 170 (see FIG. 3) so that the oxidant fluid flow removes heat energy from the SOFC 100.

Figure 2:
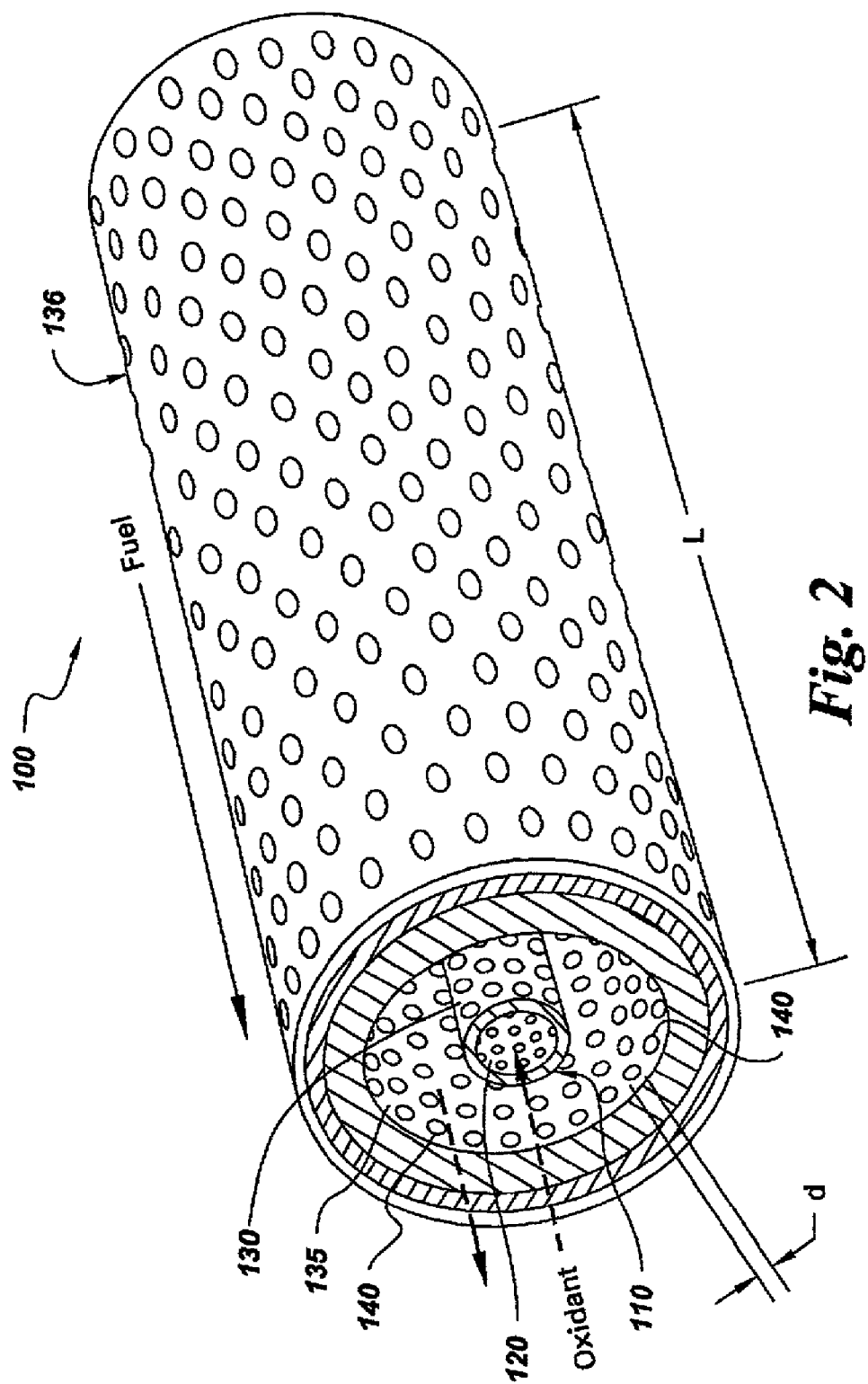
FIG. 2 is a top perspective view of FIG. 1 taken along lines 1—1.

In one embodiment of the present invention, FIG. 1 shows a plurality of concavities 140 disposed on the riser tube internal surface 120, riser tube external surface 130, internal wall surface 135 and external wall surface 136 of the SOFC 100. As used herein, the term "concavity" refers to depressions, indentations, dimples, pits or the like. The shape of the concavities 140 is typically hemispherical or inverted and truncated conically shaped. In another embodiment, the shape of the concavities 140 is typically any sector of a full hemisphere. In some embodiments, the concavities 140 are disposed on an entirety or a portion of the abovementioned surfaces.

The concavities 140 are formed on the abovementioned surfaces in a pattern that serves to enhance the heat transfer from the SOFC 100 components, such as the anode 190, cathode 200 and electrolyte 210, to a fluid, such as the oxidant or the gaseous fuel. By way of example and not limitation, it will be appreciated that the concavities 140 are disposed on the SOFC external surface 136 (see FIG. 1) or disposed within the fuel channel 180 (see FIGS. 3–6) so as to enhance the removal of heat from the SOFC 100 components to the gaseous fuel. In operation, the fluid is introduced into the SOFC 100 so as to be disposed over the concavities 140. As a result, the hydrodynamic interactions between the fluid and the concavities 140 cause the heat transfer rate in the SOFC 100 to increase compared to conventional SOFCs. As used herein, the term "hydrodynamic interactions" refers to the interactions between the concavities 140 and the fluid in which each concavity creates a pressure field within the concavity so as to create a vortex pattern in a portion of the flow of the fluid (not shown).

In operation, as the portion of the flow of the fluid interacts with the mainstream flow of the fluid, the portion of the flow of the fluid is directed to the surface of the channel so as to interact thermally with the surface thereby resulting in enhanced heat transfer from the SOFC 100 components to the fluid. In addition, the thermal interaction between the fluid and each respective concavity is increased due to an increase, with respect to a surface without concavities, in the surface area caused by the shape of each respective cavity. As such, the fluid interacts with such increased surface area thereby enhancing the removal of heat energy from the SOFC 100. The depth "Y" (see FIG. 1) for a given one of the concavities 140 typically remains constant through the length "L" of the tubular SOFC 100 (see FIG. 2) or through the length "L" of the planar cross flow SOFC 100 (see FIGS. 3–6). The depth "Y" (see FIG. 1) is generally in the range between about 0.10 to about 0.50 times the concavity surface diameter "d". In addition, the depth (Y) of the concavities 140 is in the range between about 0.002 inches to about 0.125 inches. The center-to-center spacing "X" (see FIG. 1) of the concavities 140 is generally in the range between about 1.1 to about 2 times the surface diameter "d" of the concavities 140. In one embodiment, the concavities 140 are typically formed by using a pulse electrochemical machining (PECM) process. In an alternative embodiment, the concavities 140 are typically formed by using an electro-discharge machining (EDM) process.

Figure 6:
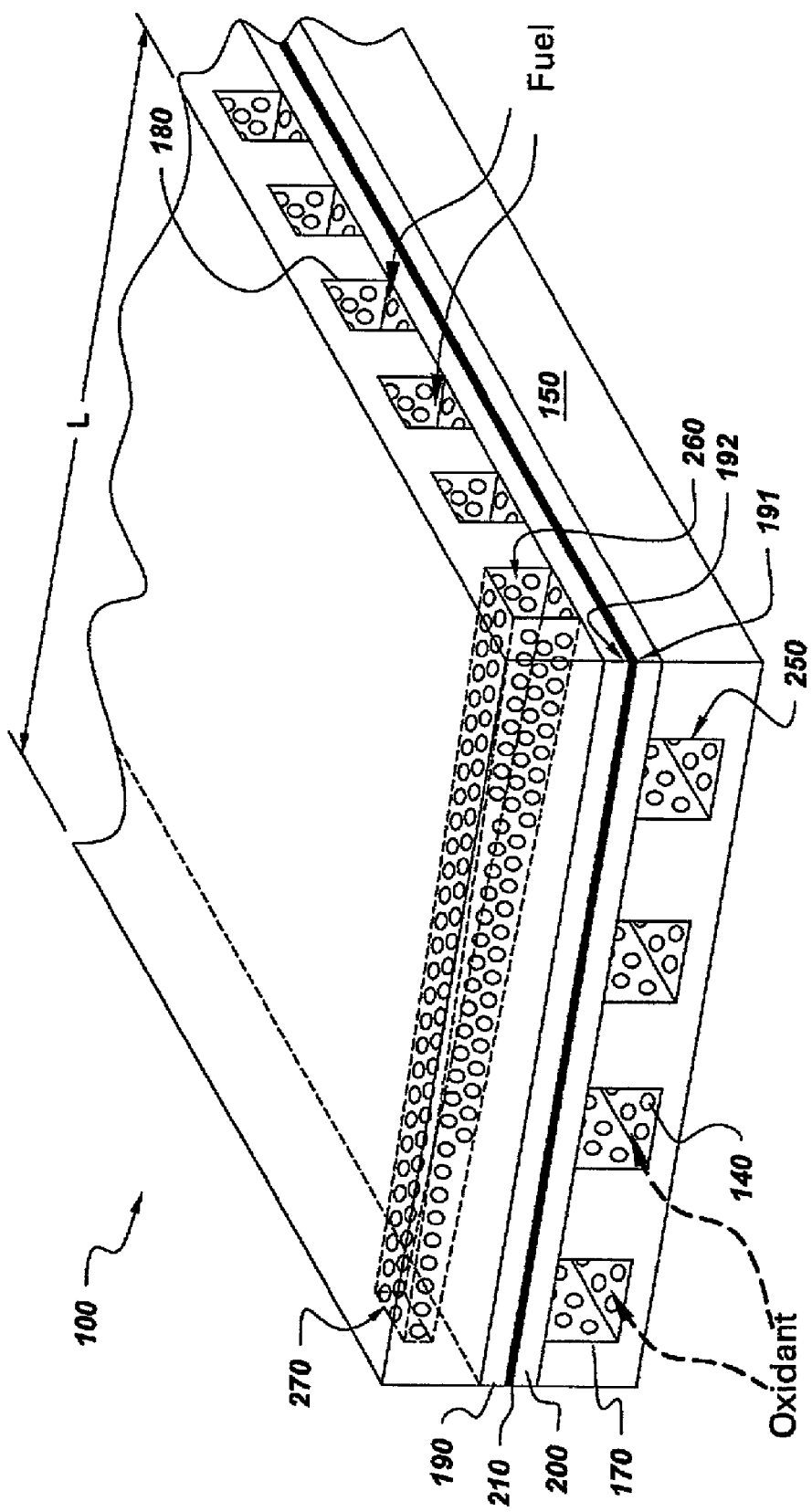
FIG. 6 is a perspective view of the planar cross flow solid oxide fuel cell of FIG. 3 in accordance with another embodiment of the present invention.

In another embodiment, the concavities 140 are disposed within the oxidant channel 170 and the fuel channel 180 (see FIG. 3). In an alternative embodiment, the concavities 140 are disposed in either the oxidant channel 170 or the fuel channel 180. In yet another embodiment, the SOFC 100 comprises the oxidant section 150 and the fuel section 160 having a first flow member 220 and a second flow member 230 disposed therein, respectively (see FIG. 4). In this embodiment, the first flow member 220 and the second flow member 230 comprise a first wedge and a second wedge, respectively. As used herein, the term "wedge" refers to the shape of the first flow member 220 and the second flow member 230 wherein the shape of such members tapers to an edge. The first and second wedges typically comprise a plurality of support members 240 that serve to align and support the wedges in the oxidant section 150 and the fuel section 160. In an alternative embodiment, FIG. 6 shows the oxidant channel 170 and the fuel channel 180 formed into tapered channels. As used herein, the term "tapered channels" refers to the shape of the channels in which such channels taper to an edge from the oxidant flow inlet 250 to the oxidant flow outlet (not shown) and a fuel flow inlet 260 to a fuel flow outlet 270.

The wedges (see FIG. 4) and the tapered channels (see FIG. 6) enhance the flow rate of oxidant or fuel in the oxidant section 150 or the fuel section 160, respectively, thereby increasing the heat transfer in the SOFC 100. In one exemplary embodiment, the wedge (see FIG. 4) shape creates a converging flow area from the oxidant flow inlet 250 to the oxidant flow outlet (not shown) of oxidant section 150 thereby affecting the heat transfer rate between the SOFC 100 components and the oxidant. It will be appreciated that the tapered channels of FIG. 6 exhibit the same characteristics as the wedges described above. Using the wedges (see FIG. 4) or the tapered channels (see FIG. 6) to create converging flow results in a substantially uniform rate of heat transfer throughout the flow path of the oxidant or gaseous fuel by effectively offsetting the decreasing thermal potential for convective heat transfer caused by the temperature increase of the oxidant or gaseous fuel thereby affecting the thermal gradient in the oxidant section 150 or the fuel section 160, respectively. The heat transfer rate is further increased by having the concavities 140 disposed on the wedges (see FIG. 4) or the tapered channels (see FIG. 6) wherein such increase is due to the hydrodynamic interactions caused by the oxidant or the gaseous fuel when disposed over the concavities 140. In some embodiments, the concavities 140 are disposed on an entirety or a portion of the abovementioned tapered channels or wedges (see FIG. 4).

Figure 5:
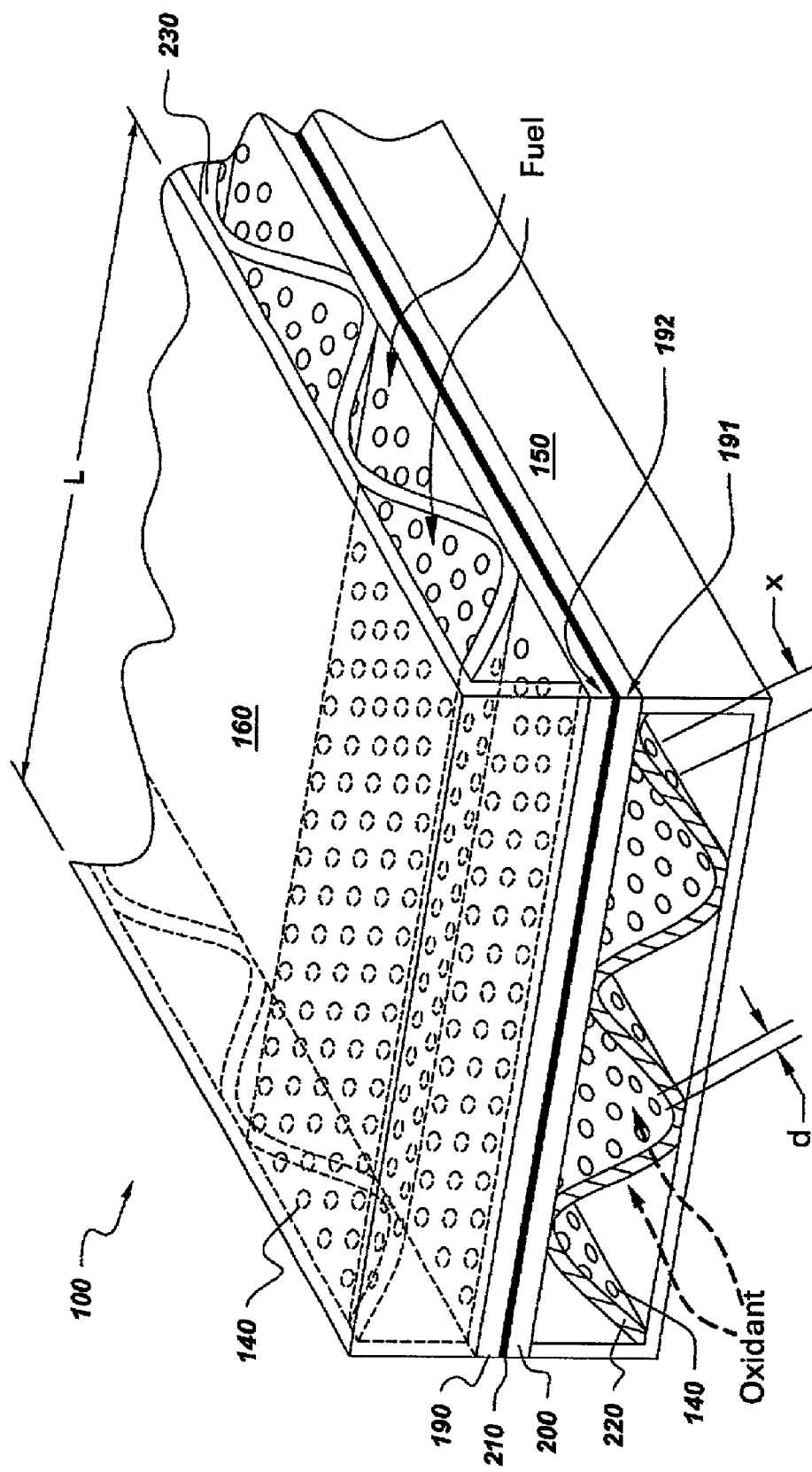
FIG. 5 is a perspective view of the planar cross flow solid oxide fuel cell of FIG. 3 in accordance with another embodiment of the present invention.

In another embodiment, the first flow member 220 and the second flow member 230 comprise a first corrugated member and a second corrugated member, respectively (see FIG. 5). As used herein, the term "corrugated" refers to the material shape of the first flow member 220 and the second flow member 230 such that the material is shaped to form a ridged or furrowed surface. As mentioned above, the concavities 140 are disposed on the corrugated members so as to cause hydrodynamic interactions between the fluid (oxidant or gaseous fuel) and the concavities 140 thereby increasing the heat transfer rate between the components of the SOFC 100 and the fluid. In one embodiment, the corrugated members are formed from sheet metal, for example, stainless steel sheet metal. It will be appreciated that the sheet metal typically varies in thickness depending upon the desired depth configuration of the concavities 140 and the peaks and valleys of the corrugated member serve the function of contacting the anode 190 and the cathode 200 for current flow.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A solid oxide fuel cell comprising:
   a thermal management section; and
   an electrolytic section disposed adjacent said thermal management section,
   wherein a plurality of concavities are disposed on at least one of said thermal management and electrolytic sections so as to cause hydrodynamic interactions and affect the heat transfer rate between a fluid and said concavities when said fluid is disposed over said concavities and said thermal management section comprises a riser tube.

2. The solid oxide fuel cell of claim 1, wherein said thermal management section comprises an oxidant section and a fuel section.

3. The solid oxide fuel cell of claim 1, wherein said electrolytic section comprises a cathode, anode and electrolyte.

4. A solid oxide fuel cell for use in a power generation apparatus comprising:
   a riser tube disposed in said solid oxide fuel cell, said solid oxide fuel cell disposed within said power generation apparatus wherein said power generation apparatus is disposed to receive a fluid therein, wherein a plurality of concavities are disposed on a surface portion of said riser tube and disposed on a surface portion of said solid oxide fuel cell so as to cause hydrodynamic interactions and affect the heat transfer rate between said fluid and said concavities when said fluid is disposed over said concavities.

5. The solid oxide fuel cell of claim 4, wherein said riser tube comprises a riser tube internal surface and a riser tube external surface and wherein said concavities are disposed on riser tube internal surface and disposed on said riser tube external surface.

6. The solid oxide fuel cell of claim 4, wherein said fluid is selected from the group consisting of gaseous fuels and oxidants.

7. The solid oxide fuel cell of claim 4, wherein said concavities are disposed on an internal surface of said solid oxide fuel cell.

8. The solid oxide fuel cell of claim 4, wherein said concavities are selected from the group consisting of depressions, indentations, dimples and pits.

9. The solid oxide fuel cell of claim 4, wherein the depth (Y) of said concavities remains constant over the length (L) of said riser tube.

10. The solid oxide fuel cell of claim 4, wherein the depth (Y) of said concavities is in the range between about 0.002 inches to about 0.125 inches.

11. The solid oxide fuel cell of claim 4, wherein the depth (Y) of said concavities is in the range between about 0.10 to about 0.50 times the surface diameter (d) of said concavities.

12. The solid oxide fuel cell of claim 4, wherein the shape of said concavities is any sector of a full hemisphere.

13. The solid oxide fuel cell of claim 4, wherein said concavities have a center-to-center spacing (X) in the range between about 1.1 to about 2.0 times the surface diameter (d) of said concavities.

14. A solid oxide fuel cell for use in a power generation apparatus comprising:
   an oxidant section having an oxidant channel disposed therein and a fuel section having a fuel channel disposed therein wherein said oxidant channel and said fuel channel are disposed to receive a fluid therein, said solid oxide fuel cell disposed within said power generation apparatus;
   wherein a plurality of concavities are disposed on a surface portion of said oxidant channel and disposed on a surface portion of said fuel channel so as to cause hydrodynamic interactions and affect the heat transfer rate between said fluid and said concavities when said fluid is disposed over said concavities and said oxidant channel and said fuel channel are tapered channels.

15. The solid oxide fuel cell of claim 14, wherein said fluid is selected from the group consisting of gaseous fuels and oxidants.

16. The solid oxide fuel cell of claim 14, wherein said concavities are selected from the group consisting of depressions, indentations, dimples and pits.

17. The solid oxide fuel cell of claim 14, wherein the depth (Y) of said concavities remains constant over the length (L) of said oxidant channel and said fuel channel.

18. The solid oxide fuel cell of claim 14, wherein the depth (Y) of said concavities is in the range between about 0.002 inches to about 0.125 inches.

19. The solid oxide fuel cell of claim 14, wherein the depth (Y) of said concavities is in the range between about 0.10 to about 0.50 times the surface diameter (d) of said concavities.

20. The solid oxide fuel cell of claim 14, wherein the shape of said concavities is any sector of a full hemisphere.

21. The solid oxide fuel cell of claim 14, wherein said concavities have a center-to-center spacing (X) in the range between about 1.1 to about 2.0 times the surface diameter (d) of said concavities.

22. A solid oxide fuel cell for use in a power generation apparatus comprising:
   an oxidant section and a fuel section wherein said oxidant section and said fuel section are disposed to receive a fluid therein, said solid oxide fuel cell disposed within said power generation apparatus; and a first flaw member disposed within said oxidant section and a second flow member disposed within said fuel section wherein a plurality of concavities are disposed on a portion of said first flow member and a portion of said second flow member so as to cause hydrodynamic interactions and affect the heat transfer rate between said fluid and said concavities when said fluid is disposed over said concavities;

wherein said first how member and second flow member comprise a first wedge and a second wedge respectively.

23. The solid oxide fuel cell of claim 22, wherein said fluid is selected from the group consisting of gaseous fuels and oxidants.

24. The solid oxide fuel cell of claim 22, wherein said first wedge and said second wedge comprise a plurality of support members and wherein said plurality of support members comprise a plurality of concavities disposed thereon.

25. The solid oxide fuel cell of claim 22, wherein said first flow member and second flow member comprise a first corrugated member and a second corrugated member respectively.

26. The solid oxide fuel cell of claim 22, wherein said concavities are disposed on a portion of an internal surface of said oxidant section and said fuel section.

27. The solid oxide fuel cell of claim 22, wherein said concavities are selected from the group consisting of depressions, indentations, dimples and pits.

28. The solid oxide fuel cell of claim 22, wherein the depth (Y) of said concavities remains constant over the length of said first and second flow member.

29. The solid oxide fuel cell of claim 22, wherein the depth (Y) of said concavities is in the range between about 0.002 inches to about 0.125 inches.

30. The solid oxide fuel cell of claim 22, wherein the depth (Y) of said concavities is in the range between about 0.10 to about 0.50 times the surface diameter (d) of said concavities.

31. The solid oxide fuel cell of claim 22, wherein the shape of said concavities is any sector of a full hemisphere.

32. The solid oxide fuel cell of claim 22, wherein said concavities have a center-to-center spacing (X) in the range between about 1.1 to about 2.0 times the surface diameter (d) of said concavities.

* * * * *